3,009,892
DELAYED ADDITION OF EMULSIFYING AGENT IN AQUEOUS POLYMERIZATION OF TETRAFLUOROETHYLENE
Jack Ernest Duddington, Cleveleys, and Stanley Sherratt, Welwyn Garden City, England, assignors to Imperial Chemical Industries Limited, London, England, a corporation of Great Britain
No Drawing. Filed Dec. 26, 1957, Ser. No. 705,083
Claims priority, application Great Britain Jan. 11, 1957
10 Claims. (Cl. 260—29.6)

This invention relates to improvement in polymerisation processes and more specifically to an improved process for polymerising tetrafluoroethylene to yield aqueous colloidal polymeric dispersions.

It has been proposed to prepare polytetrafluoroethylene in the form of an aqueous colloidal dispersion by polymerising monomeric tetrafluoroethylene in aqueous medium in the presence of particular organic peroxide catalysts, such as disuccinic acid peroxide. This method normally yields relatively low concentrations of colloidal polymer in the dispersed state and special steps have to be taken to produce a higher solids dispersion. It has also been proposed to obtain polytetrafluoroethylene dispersions of high solids content by the use of special types of dispersing agents comprising the alkali metal and ammonium salts of perfluorinated carboxylic acids. These fluorinated acid derivatives, however, are expensive compared with the more conventional types of compounds having surface-active properties, which compounds have hitherto been regarded as unsuitable for use as dispersing agents in tetrafluoroethylene polymerisations because of their inhibiting effect on the growth of polymer chains. Furthermore, we have found that the dispersed polymer particles produced according to the prior art processes, in which these fluorinated acid derivatives are present from the beginning of the polymerisation reaction are characterised by their small particle size, e.g. spheroidal particles of 0.1 micron mean size.

It is an object of the present invention to provide a process for obtaining stable, aqueous dispersions of relatively large sized particles of polymerised tetrafluoroethylene. It is another object of this invention to provide a process for producing stable aqueous dispersions of polymerised tetrafluoroethylene of high solids content which allows the use of certain of the conventional dispersing agents.

According to the present invention we provide a process for polymerising tetrafluoroethylene in an aqueous medium to obtain a colloidal polymer dispersion which comprises initiating the polymerisation of the tetrafluoroethylene in the presence of water containing a catalytic amount of a water-soluble catalyst and, only after the polymerisation has started but before the amount of polymer formed exceeds 10 percent by weight of the aqueous phase plus polymer, adding thereto an anionic dispersing agent, and continuing the polymerisation reaction. In order to keep the amount of coagulum formed as low as possible we prefer to add the dispersing agent before the amount of polymer formed exceeds 7 percent by weight of the aqueous phase plus polymer.

One of the surprising features of this invention is the fact that the polymerisation proceeds at all after the addition of conventional anionic dispersing agents since, as already stated, these dispersing agents normally inhibit the polymerisation of tetrafluoroethylene completely if they are present at the start of the reaction. However, by the delayed addition of these dispersing agents in accordance with the present invention, it has been found possible to prepare polytetrafluoroethylene dispersions of high solids content and large particle size.

In general, the polymerisation will be effected at super-atmospheric pressure in order to obtain a reasonably fast rate of reaction. For this reason, the use of pressures greater than 150 lb./sq. in. are preferred. As tetrafluoroethylene is a gas, an indication that polymerisation has begun will be registered by a fall in pressure of the system.

The amount of coagulum formed during the process of this invention depends on a number of factors, including the rate at which the system is stirred. In the preferred way of working according to the present invention the polymerisation is effected in the presence of a saturated hydrocarbon having more than 12 carbon atoms which is liquid under the polymerisation conditions, e.g. octadecane, eicosane, tetradecane, cetane and paraffin waxes having melting points below the temperature of polymerisation. Such hydrocarbons are normally added to the aqueous medium before initiation of the polymerisation in proportions of between 0.1% and 12% by weight of the water. These hydrocarbons are efficient stabilisers against coagulation of the polymer and allow through agitation of the polymerisation system.

The addition of the dispersing agents of this invention may be effected in one step, in a number of steps or continuously during the course or a part of the remainder of the polymerisation after the initial introduction.

Suitable classes of anionic dispersing agents which may be used are (a) water-soluble salts of sulphuric acid esters of fatty alcohols, i.e. alcohols corresponding to fatty acids of animal and vegetable fats and oils, and soaps, (b) water-soluble salts of aromatic sulphonic acids, (c) water-soluble salts of polyfluorocarboxylic acids having the formula $X(CF_2)_nCOOH$, where X is hydrogen, chlorine or fluorine and $n$ is 6 to 20, and (d) water-soluble salts of polyfluorochlorocarboxylic acids of the formula $Cl(CF_2-CFCl)_nCF_2COOH$, where $n$ is 2 to 6. On account of their cheapness and availability particularly suitable dispersing agents for use in our invention comprise monoethanolamine lauryl sulphate, triethanolamine lauryl sulphate, ammonium lauryl sulphate and sodium lauryl sulphate.

Dispersed polytetrafluoroethylene particles having a mean particle size of 0.2 micron and above have been obtained by working according to the present invention.

The amount of anionic dispersing agent used will vary according to the compound used, but in general it will lie between 0.01 and 0.5% by weight of the water. We prefer to use less than 0.1% of said dispersing agent by weight of the water in order that the polymerisation reaction will proceed at a reasonably fast rate.

The catalyst used is preferably a water-soluble peroxy compound, e.g. ammonium persulphate, an alkali metal persulphate or disuccinic acid peroxide. Alternatively it may comprise a water-soluble azo compound such as disodium gamma,gamma'-azobis (gamma-cyanovalerate). The amount of catalyst used will normally be between 0.001% and 0.5% by weight of the water.

The present invention may be used to polymerise tetrafluoroethylene alone or with a small amount, e.g. up to about 25% by weight, of one or more ethyleneically unsaturated monomers such as vinyl fluoride, vinylidene fluoride, monochlorotrifluoroethylene, hexafluoropropylene, hexafluorocyclobutylene, ethylene and styrene. It is preferred to polymerise tetrafluoroethylene alone or to copolymerise it with a fully fluorinated compound such as hexafluoropropylene.

The polytetrafluoroethylene dispersions of our invention may be used in film-forming, coating and impregnation applications, normally after the addition of further amounts of dispersion stabiliser and concentrating, e.g. by electro-decantation, to a higher solids content. In these applications the body to be treated is first coated or impregnated with the polymer dispersion, the aqueous phase of the dispersion is removed, and the deposited polymer particles are baked at a temperature above the sintering temperature. Films and coatings with a reduced tendency to cracking and pin-hole formation are readily obtainable in this manner.

Our invention is illustrated but in no way limited by the following examples in which all parts are by weight unless otherwise specified.

*Example 1*

A stainless steel autoclave fitted with a stirrer was charged with 4,000 parts of distilled water, 2.66 parts of disuccinic acid peroxide and 20 parts of eicosane after which the vessel was evacuated to remove oxygen and then pressurised with tetrafluoroethylene gas until the pressure gauge on the autoclave read 15 lb./sq. in. The reaction medium was heated with stirring to a temperature of 70° C. and gaseous tetrafluoroethylene was introduced to 300 lb./sq. in. pressure. When the pressure dropped to 290 lb./sq. in., a further quantity of tetrafluoroethylene was introduced until the pressure returned to 300 lb./sq. in. This procedure was repeated throughout the reaction. When 200 parts of polymer had been formed, as indicated by a total pressure drop of 80 lb./sq. in., a solution of 1 part of ammonium perfluorooctanoate dissolved in 100 parts of distilled water was injected into the reaction mixture. After a total polymerisation time of 2 hours an aqueous colloidal dispersion of polytetrafluoroethylene containing 10.4% by weight of the dispersed polymer was obtained. The mean particle size of the dispersed particles was 0.25 micron. The amount of coagulated polymer present was 2.0% of the combined weight of the colloidal polymer in dispersion and the coagulum. The rate of the reaction measured by the space/time yield of dispersed polymer was 56.5 grams/litre/hour.

*Example 2*

The process of Example 1 was repeated using 1 part of sodium lauryl sulphate instead of ammonium perfluorooctanoate as dispersing agent. After 2 hours 50 minutes a colloidal dispersion containing 8.4% by weight of dispersed polytetrafluoroethylene was obtained without the formation of coagulum. The rate of the reaction was 32.5 grams/litre/hour. The mean particle size of the dispersed particles was 0.23 micron.

*Example 3*

The above process was repeated using 1 part of ammonium lauryl sulphate as dispersing agent. After 2 hours 30 minutes a colloidal dispersion containing 11.8% by weight of dispersed polytetrafluoroethylene was obtained together with 3.7% of coagulum based on the combined weight of dispersed polymer and coagulum. The rate of the reaction was 53.0 grams/litre/hour. The mean particle size of the dispersed particles was 0.23 micron.

*Example 4*

The above process was repeated using 1 part of triethanolamine lauryl sulphate as dispersing agent. After 3 hours a colloidal dispersion containing 11.3% by weight of dispersed polytetrafluoroethylene was obtained together with 4.5% of coagulum based on the combined weight of dispersed polymer and coagulum. The rate of the reaction was 40.0 grams/litre/hour. The mean particle size of the dispersed particles was 0.20 micron.

*Example 5*

The above process was repeated using 1 part of the sodium salt of 1-methoxy-4-amino-oleyl benzene sulphonic acid as dispersing agent. After 3 hours 20 minutes a colloidal dispersion containing 14.4% by weight of dispersed polytetrafluoroethylene was obtained together with 6.5% of coagulum based on the combined weight of dispersed polymer and coagulum. The rate of the reaction was 48.4 grams/litre/hour. The mean particle size of the dispersed particles was 0.22 micron.

*Example 6*

The above process was repeated using 1 part of the sodium salt of dinaphthylmethane disulphonic acid as dispersing agent. After 2 hours 40 minutes a colloidal dispersion containing 11.1% by weight of dispersed polytetrafluoroethylene was obtained together with 3.9% of coagulum based on the combined weight of dispersed polymer and coagulum. The rate of the reaction was 47.0 grams/litre/hour. The mean particle size of the dispersed particles was 0.23 micron.

*Example 7*

The above process was repeated using 1 part of monoethanolamine lauryl sulphate as dispersing agent. After 2 hours 35 minutes a colloidal dispersion containing 11.1% by weight of dispersed polytetrafluoroethylene was obtained together with 3.25% of coagulum based on the combined weight of dispersed polymer and coagulum. The rate of the reaction was 47.5 grams/litre/hour. The mean particle size of the dispersed particles was 0.20 micron.

*Example 8*

The above process was repeated using 2 parts of monoethanolamine lauryl sulphate as dispersing agent. After 3 hours 18 minutes a colloidal dispersion containing 10.1% by weight of dispersed polytetrafluoroethylene was obtained without the formation of coagulum. The rate of the reaction was 33.4 grams/litre/hour. The mean particle size of the dispersed particles was 0.21 micron.

*Example 9*

The above process was repeated using a solution of 1 part of monoethanolamine lauryl sulphate dissolved in 100 parts of distilled water, which solution was injected into the reaction mixture when 80 parts of polymer had been formed. No other additions of dispersing agent were made. After a total polymerisation time of 3 hours 28 minutes a colloidal dispersion containing 10.4% by weight of dispersed polytetrafluoroethylene was obtained without the formation of coagulum. The rate of the reaction was 33.9 grams/litre/hour. The mean particle size of the dispersed particles was 0.20 micron.

*Example 10*

The above process was repeated using a solution of 1 part of monoethanolamine lauryl sulphate dissolved in 100 parts of distilled water, which solution was injected into the reaction mixture when 280 parts of polymer had been formed. No other additions of dispersing agent were made. After a total polymerisation time of 2 hours 36 minutes a colloidal dispersion containing 11.6% by weight of dispersed polytetrafluoroethylene was obtained together with 4.9% of coagulum based on the combined weight of dispersed polymer and coagulum. The rate of the reaction was 47.0 grams/litre/hour. The mean particle size of the dispersed particles was 0.22 micron.

In a control run, under the same conditions as above but omitting the step of injecting any dispersing agent and holding the contents of the autoclave at a temperature of 70° C. for 2 hours 30 minutes, a colloidal dispersion containing only 7.7% by weight of dispersed polytetrafluoroethylene was obtained together with as much as 6.0% of coagulated polymer based on the combined weight of dispersed polymer and coagulum. The rate of the reaction was 31.6 grams/litre/hour. The mean particle size of the dispersed particles was 0.1 micron.

We claim:

1. In a process for the production of aqueous colloidal dispersions of tetrafluoroethylene homopolymers and copolymers of tetrafluoroethylene with up to 25 percent of at least one member of the group consisting of vinyl fluoride, vinylidene fluoride, monochlorotrifluoroethylene, hexafluoropropylene, hexafluorocyclobutylene, ethylene and styrene in the presence of a catalytic amount of a water-soluble polymerization catalyst; the improvement which comprises initiating polymerization of a member of the group consisting of tetrafluoroethylene and a mixture of tetrafluoroethylene with up to 25 percent of at least one member of the group consisting of vinyl fluoride, vinylidene fluoride, monochlorotrifluoroethylene, hexafluoropropylene, hexafluorocyclobutylene, ethylene and styrene, in the absence of an emulsifying agent, and, only after the amount of polymer formed exceeds about 2 percent of the aqueous phase plus polymer but before the amount of polymer formed exceeds about 10 percent by weight of the aqueous phase plus polymer, adding between about 0.01 and 0.5 percent based on the weight of water of an anionic dispersing agent to the composition and effecting further polymerization by maintaining the resultant mixture at the polymerizing temperature to which it has been heated.

2. A process according to claim 1 in which said anionic dispersing agent is added before the amount of polymer formed exceeds 7 percent by weight of the aqueous phase plus polymer.

3. A process according to claim 1 in which the polymerization is effected in the presence of a saturated hydrocarbon having more than 12 carbon atoms which is liquid under the polymerization conditions.

4. A process according to claim 1 in which said anionic dispersing agent comprises a water-soluble salt of a polyfluorocarboxylic acid having the formula $X(CF_2)_nCOOH$, where X is selected from the group consisting of hydrogen, chlorine and fluorine and $n$ is 6 to 20.

5. A process according to claim 1 in which said anionic dispersing agent comprises a water-soluble salt of a polyfluorochlorocarboxylic acid of the formula $$Cl(CF_2-CFCl)_nCF_2COOH$$

where $n$ is 2 to 6.

6. A process according to claim 1 in which said anionic dispersing agent comprises a water-soluble salt of an aromatic sulphonic acid.

7. A process according to claim 1 in which said anionic dispersing agent comprises a water-soluble salt of a sulphuric acid ester of a fatty alcohol.

8. A process according to claim 1 in which said anionic dispersing agent is monoethanolamine lauryl sulphate.

9. A process according to claim 1 in which less than 0.1%, by weight of the water, of said anionic dispersing agent is used.

10. A process for the production of colloidal polymer dispersions as set forth in claim 1 in which the anionic dispersing agent is not added before the amount of polymer formed exceeds about 5% of the weight of the aqueous phase plus polymer.

References Cited in the file of this patent

UNITED STATES PATENTS

| 2,612,484 | Bankoff | Sept. 10, 1952 |
| 2,750,350 | Kroll | June 12, 1956 |
| 2,766,215 | Stoops et al. | Oct. 9, 1956 |
| 2,843,502 | Fay | July 15, 1958 |

OTHER REFERENCES

Lontz et al.: "Industrial and Engineering Chemistry," pages 1800–1805, volume 44, No. 8.